United States Patent Office 2,917,675
Patented Dec. 15, 1959

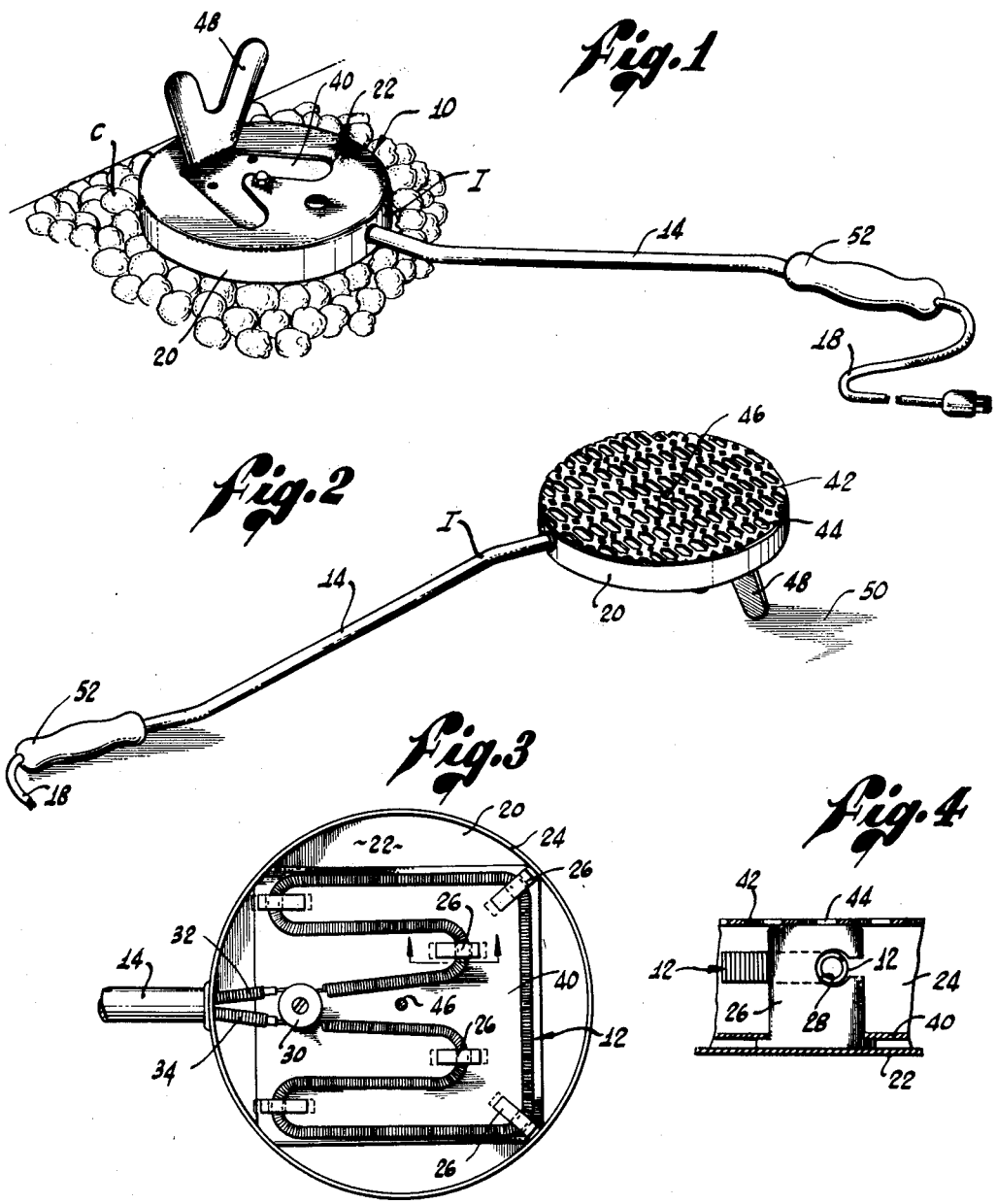

2,917,675

ELECTRIC CHARCOAL IGNITER

Charles W. Norton, Jr., Pasadena, Calif.

Application May 28, 1956, Serial No. 587,607

2 Claims. (Cl. 317—98)

The present invention relates generally to fire lighting devices and more particularly to a new and novel device adapted to ignite the bed of charcoal utilized in charcoal broilers.

Charcoal barbecuing and broiling devices are finding ever wider acceptance among householders. A major disadvantage of such devices, however, is the inconvenience and difficulty involved in igniting the charcoal. Generally, the charcoal is ignited either by means of kindling or by means of an inflammable liquid. Where kindling is used, its arrangement in the broiler is both time consuming and messy. Where an inflammable liquid is employed, it is not only dangerous but additionally often causes foods cooked on the broiler to be given a disagreeable odor.

It is a major object of the present invention to provide an electric charcoal igniter which eliminates the difficulties heretofore presented in igniting charcoal.

It is another object of the invention to provide an electric charcoal igniter which is both foolproof and safe to use.

A further object is to provide an electric charcoal igniter having special means for preventing its user from electric shock.

Another object of the invention is to provide an electric charcoal igniter having novel means for preventing its accidental contact with an inflammable surface.

Yet a further object of the invention is to provide an electric charcoal igniter which is simple in design and rugged of construction whereby it may afford a long and trouble-free service life.

Yet another object is to provide an electric charcoal igniter which may be manufactured at a comparatively low cost so as to be available to a large market.

A further object of the invention is to provide an electric charcoal igniter which allows its user to remain perfectly clean.

These and other objects and advantages of the present invention will become apparent from the following detailed description, when taken in conjunction with the appended drawings, wherein:

Figure 1 is a perspective view of an electric charcoal igniter embodying the present invention being employed to ignite charcoal;

Figure 2 is a perspective view of said igniter in a non-operative position;

Figure 3 is a fragmentary top plan view of said igniter with its faceplate removed in order to show its internal construction; and Figure 4 is an enlarged vertical sectional view taken on line 4—4 of Figure 3.

Referring to the drawings, the preferred form of electric charcoal igniter I embodying the present invention broadly comprises a head member, generally designated 10, wherein is mounted an electric resistance heating element 12 and an elongated handle 14 extending from one side of the head 10. Electric current is supplied to the heating element 12 by means of an electric cord 18 extending through the handle 14. In use, the igniter I is arranged as shown in Figure 1 with the heating element 12 adjacent a bed of charcoal C. The heat generated by the heating element 12 is transferred to the charcoal C so as to cause it to be ignited.

More particularly, the head 10 includes a cup-shaped metallic body 20. This body 20 includes a bottom wall 22 and upstanding side walls 24. As indicated in Figures 3 and 4, a plurality of vertical spacers 26 extend upwardly from the bottom wall 22. The upper portion of each of these spacers 26 is formed with a recess 28 for receiving the coiled wire from which is formed the heating element 12. The ends of the heating element 12 are connected to a terminal 30 that is affixed to the bottom wall 22. The opposite side of this terminal 30 is connected to the two leads 32 and 34 of the electric cord 18.

Referring again to Figures 3 and 4, a flat, generally square reflector 40, preferably formed of stainless steel, is rigidly mounted within the body 20 below the heating element 12. The upper end of the body 20 is closed by a faceplate 42 formed with a plurality of apertures 44. The faceplate 42 is secured in place by means of a screw element 46. The reflector 40 serves to reflect heat from the heating element 12 through the apertures 44 of the faceplate 42.

As shown in Figures 1 and 2, a stand 48 is stamped from the bottom wall 22 of the body 20. This stand 48 is adapted to support the head 10 above a supporting surface 50 when the igniter I is not in use. With this arrangement, heat from the igniter is prevented from inflicting damage to the support surface 50. The handle 14 is preferably of tubular metal construction. A handgrip 52 is affixed to the end of this handle remote from the body 10. This handgrip 52 should be formed of a material which has a low coefficient of heat-transfer.

Referring again to Figure 1, at such time as the igniter I is in contact with the bed of charcoals C, the user will be protected from electric shock by the apertured faceplate 42. If such a faceplate were not employed, the heating element 12 could come into contact with the charcoal C. Inasmuch as charcoal may sometimes act as an electric current conducting means, it is essential that such direct contact between the heating element and the charcoal be prevented. After the charcoal has been ignited, the igniter I may be removed therefrom and positioned upon a convenient supporting surface 50, as indicated in Figure 2. At this time, the stand 48 will positively restrain contact of the hot body 20 with the supporting surface 50. In this manner, heat damage to the supporting surface 50 will be effectively prevented.

While there has been shown and described hereinabove what is presently considered to be the preferred embodiment of the present invention, it will be apparent that various changes and modifications may be made thereto without departing from the spirit of the invention or the scope of the following claims.

I claim:

1. A charcoal igniter, comprising: a head member; an electric-resistance heating element mounted in said head; a faceplate formed on said head and covering said heating element, said faceplate being formed with a plurality of apertures; a reflector plate formed in said head behind said heating element so as to reflect heat through said faceplate with said faceplate preventing direct contact between said heating element and the charcoal being ignited; a stand formed on said head for maintaining it spaced from a supporting surface when said igniter is not being used to ignite charcoal; an elongated handle extending from said head; and electric wiring connected to said heating element and extending through said handle, said wiring being connectible to a source of electric current.

2. A charcoal igniter comprising: a head member having a bottom wall, said bottom wall being stamped out so as to define a downwardly extending stand; an electric-resistance heating element mounted within said head; a faceplate formed on the upper portion of said head and covering said heating element, said faceplate being formed with a plurality of apertures; a reflector plate disposed in said head downwardly of said heating element so as to reflect heat through said faceplate with said faceplate preventing direct contact between said heating element and the charcoal being ignited; an elongated handle extending from said head; and electric wiring connected to said heating element and extending through said handle, said wiring being connectible to a source of electric current, when said igniter is to be utilized to ignite charcoal, said igniter being inverted from its normal position when employed to ignite said charcoal and said igniter normally resting upon said stand when not in use whereby it will be maintained spaced from the supporting surface upon which it is resting.

References Cited in the file of this patent
UNITED STATES PATENTS

| | | |
|---|---|---|
| 548,396 | Schindler | Oct. 22, 1895 |
| 1,592,867 | Parker | July 20, 1926 |
| 2,010,460 | McKinley | Aug. 6, 1935 |
| 2,210,720 | Johnson | Aug. 6, 1940 |
| 2,588,185 | Walter | Mar. 4, 1952 |

FOREIGN PATENTS

| | | |
|---|---|---|
| 454,649 | Germany | Jan. 13, 1928 |